United States Patent [19]

Brown

[11] Patent Number: 5,051,299

[45] Date of Patent: Sep. 24, 1991

[54] FIBRE REINFORCED BELT

[75] Inventor: Trevor A. Brown, Sarnia, Canada

[73] Assignee: Polysar Limited, Sarnia, Canada

[21] Appl. No.: 421,097

[22] Filed: Oct. 13, 1989

[51] Int. Cl.$^5$ .............................................. B32B 27/36
[52] U.S. Cl. ................................... 428/221; 428/285; 428/286; 428/287; 428/292; 428/293; 428/295; 428/364; 428/365; 428/288
[58] Field of Search ............... 428/364, 221, 224, 286, 428/284, 285, 287, 365, 292, 293, 295, 252, 268, 375, 390, 392, 394, 395; 525/329.3, 370, 380

[56] References Cited

U.S. PATENT DOCUMENTS 4,452,951 6/1984 Kubo et al. .
4,460,029 7/1984 Schuetz et al. ................. 428/295 X
4,464,515 8/1984 Rempel et al. .
4,643,938 2/1987 Oyama et al. .
4,721,496 1/1988 Yokoyama et al. .
4,762,745 8/1988 Mashimo et al. .
4,795,788 1/1989 Himmler et al. .
4,879,352 11/1989 Fulton et al. ....................... 525/380

Primary Examiner—Lorraine T. Kendell
Attorney, Agent, or Firm—Stevens, Davis, Miller & Mosher

[57] ABSTRACT

The present invention relates to fiber-reinforced belts, such as timing belts or conveyor belts, which are manufactured from a hydrogenated nitrile rubber having oxazoline functionality. Thus, the hydrogenated nitrile rubber contains less than 10 mole percent carbon-carbon double bond unsaturation and a functional group which may be identified using infrared spectroscopy by a characteristic peak between 1552 cm$^{-1}$ and 1668 cm$^{-1}$. The present belts are further characterized by having excellent adhesion between the fiber reinforcement and the oxazoline functionalized hydrogenated nitrile rubber.

6 Claims, No Drawings

FIBRE REINFORCED BELT

FIELD OF THE INVENTION

This invention relates to fibre-reinforced rubber belts which are prepared with a hydrogenated nitrile rubber having oxazoline functionality.

BACKGROUND OF THE INVENTION

Fibre reinforcement is commonly used in a wide variety of rubber goods, including tires, geotextile membranes, hoses and belts. It is critical to ensure good adhesion between the fibre and rubber in such goods, so that the fibre/rubber interface is not the primary cause of failure. This need is particularly acute for dynamic applications, such as belts, where the flexing of the rubber product increases the stress on the rubber-to-fibre bond.

Hydrogenated nitrile rubber, also referred to herein as HNBR, is employed in the production of fibre-reinforced belts (e.g. timing belts, conveyor belts, v-belts). HNBR has a balance of strength, heat resistance and oil resistance properties which suggests its use in belts that are used in harsh environments. Examples of reinforced belts made from hydrogenated nitrile rubber are disclosed in U.S. Pat. Nos. 4,643,938, 4,762,745 and 4,721,496. However, the adhesion characteristics of HNBR to conventional reinforcing fibres are mediocre. Accordingly, there is a need to provide improved adhesion between HNBR and reinforcing fibres, particularly for use in fibre-reinforced belts.

SUMMARY OF THE INVENTION

The present invention consists of a fibre-reinforced belt comprising fibres and vulcanized, oxazinolated hydrogenated nitrile rubber, wherein said oxazinolated hydrogenated nitrile rubber is characterized by having less than 10 mole percent unsaturation and by having oxazoline functionality which produces a characteristic peak at between 1552 cm$^{-1}$ and 1668 cm$^{-1}$ in the infrared spectrum.

DETAILED DESCRIPTION

Hydrogenated nitrile rubber is prepared by the catalytic hydrogenation of nitrile rubber. Nitrile rubber is a well known article of commerce which ma·be synthesized by the free radical, emulsion polymerization of a $C_{4\ to\ 6}$ conjugated diene monomer (e.g. butadiene, isoprene) and a $C_{3\ to\ 5}$ $\alpha, \beta$ unsaturated nitrile (such as acrylonitrile). A typical nitrile rubber is a copolymer of acrylonitrile and butadiene containing 18 to 50 weight percent acrylonitrile units (with the balance consisting of butadiene units) and having a Mooney viscosity ($ML_{1+4}$ at 100° C.) of 25 to 100.

The carbon-carbon double bonds of nitrile rubber may be "selectively" hydrogenated (i.e. with essentially no hydrogenation of carbon-nitrogen triple bonds) by treating a solution of nitrile rubber with hydrogen in the presence of a selective catalyst. Suitable processes to prepare hydrogenated nitrile rubber are described in U.S. Pat. No. 4,464,515, U.S. Pat. No. 4,795,788 and U.S. Pat. No. 4,452,951, the disclosures of which are incorporated herein by reference. As used herein the term hydrogenated nitrile rubber " refers to a nitrile rubber which has been selectively hydrogenated to the extent that it contains less than 10 mole percent carbon-carbon double bond· unsaturation.

Highly preferred hydrogenated nitrile rubber for use as a starting material in the present invention contains from 5 to 1 mole percent carbon-carbon double bond unsaturation, and is prepared by the catalytic hydrogenation of an acrylonitrile-butadiene rubber having from 25 to 45 weight percent acrylonitrile units.

The preparation of oxazoline modified hydrogenated nitrile rubber is described in U.S. Ser. No. 291,264 (filed 12/30/88), now U.S. Pat. No. 4,879,352 the disclosure of which is incorporated herein by reference. Briefly, oxazoline modified HNBR may be prepared by reacting a solution of HNBR with an amino alcohol of the formula

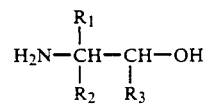

(wherein $R_1$ and $R_2$ are independently selected from H and $CH_3$ and $R_3$ is selected from H, a $C_{1-5}$ alkyl and aryl), in the presence of a catalytic quantity of zinc acetate or cadmium acetate. A preferred method to prepare oxazoline modified HNBR utilizes a 1 to 12 percent solution of HNBR in chlorobenzene weight HNBR/weight chlorobenzene basis), together with from 1 to 15 weight percent ethanolamine (weight ethanolamine/weight chlorobenzene) and 0.5 to 5 weight percent zinc acetate (weight zinc acetate/weight chlorobenzene basis). The solution is preferably reacted at from 80 t 140° C for 10 to 30 hours, followed by the recovery of the oxazoline modified HNBR using conventional coagulation/drying techniques. The oxazoline functionality is produced by a reaction between a portion of the bound nitrile units of the HNBR with the aminoalcohol. Oxazoline functionalized HNBR which is preferred for use in the present invention has from 0.5 to 5 percent of the original nitrile units converted to oxazoline units.

The rubber belts of the present invention are vulcanized. Suitable vulcanization systems include organic hydro) peroxides, combinations of organic hydro) peroxides with coagents, sulfur vulcanization systems and sulfur-donor vulcanization system. While not wishing the invention to be restricted to the use of any particular vulcanization system, the use of a sulfur-containing vulcanization system is preferred.

Rubber belts are typically reinforced with fibre in the form of a strand, cord, rope or fabric. The films may be prepared with such materials as fibreglass, polyvinyl alcohol, polyamide (or "nylons"), polyaramid (e.g. KEVLAR ®) or polyesters.

Fibres are normally subjected to some form of pretreatment to improve their adhesion to rubber. For example, glass fibres are frequently pre-treated with resorcinol-formaldehyde latex by manufacturers of fibreglass cord. Such pre-treated fibres may also be post-treated with further adhesion-enhancing additives such as elastomer latex, epoxies, silanes and isocyanates.

The fibre-reinforced belts may also contain ingredients which are conventionally employed by those skilled in the art of rubber compounding, such as plasticizers fillers, processing aids and reinforcing agents.

The present invention is further illustrated by the following Example, in which all parts and percentages are be weight unless otherwise stated.

EXAMPLE

This example illustrates the improved adhesion of oxazoline modified HNBR to reinforcing fibres.

Part I - Preparation of HNBR

A solution of acrylonitrile-butadiene rubber (having 38 percent bound acrylonitrile units and 62 percent bound butadiene units) in chlorobenzene was hydrogenated in the presence of hydridorhodium tetrakistriphenyl phosphine, and additional triphenylphosphine, according to the process described in U.S. Pat. No. 4,464,515. The resulting HNBR was recovered from solution, dried and then analyzed by infrared spectroscopy. 98.6 mole percent of the carbon-carbon double bonds were determined to be hydrogenated based on the infrared spectroscopy results. This HNBR was used in the comparative experiments of Part III of this Example, and was also used to prepare the oxazoline modified HNBR of the inventive experiments.

Part II - Preparation of Oxazoline Modified HNBR

A solution was prepared by adding 300 grams of the HNBR of Part I to 4700 grams of chlorobenzene. Oxazoline modified HNBR was then prepared as described below.

The HNBR-in-chlorobenzene solution was transferred to a 12 liter round bottom flask equipped with a condenser, mechanical stirrer, thermometer and a rubber septum. 25 grams of zinc acetate dihydrate was then added to the flask and the solution was heated to 110° C. using a heating mantle. 200 grams of 2-ethanolamine was then added to the solution over a 10 minute period. The solution in the flask was stirred and heated for 17 hours at 115° C. The rubber was then recovered from the solution by steam coagulation, screening and drying. The resulting oxazoline-modified HNBR was analyzed by proton nuclear magnetic resonance spectroscopy and found to exhibit characteristic triplets at 3.8 and 4.2 ppm. Infrared spectral analysis showed an oxazoline-characteristic peak at 1660 cm$^{-1}$ (+8 cm$^{-1}$).

Accordingly, for convenience, the term "oxazinolated hydrogenated nitrile rubber" is used herein to refer to an oxazoline modified hydrogenated nitrile rubber having a characteristic peak at between 1652 cm$^{-1}$ and 1668 cm$^{-1}$ on its infrared spectrum.

The intensity of this peak indicated that 3.5 percent of the acrylonitrile units had been converted to oxazoline units.

Part III - Adhesion Testing

Rubber compounds were prepared by mill mixing the ingredients shown in Table 1.

The compounds were then used to prepare samples for an adhesion test (ASTM D 2138, "H" adhesion test).

The "fibre" or "cord" used in these experiments was a commercially available, resorcinol-formaldehyde treated fibreglass cord.

Nine inventive experiments (using compound 1 of Table 1, based on the above-described oxazinolated hydrogenated nitrile rubber and eight comparative experiments (based o the HNBR of Part I of this Example) were completed. The results are tabulated in table 2.

The adhesion test results show that oxazinolated hydrogenated nitrile rubber demonstrates significantly better adhesion to the cord in comparison to HNBR: the mean inventive adhesion value is 41 percent higher than the mean comparative adhesion value and the standard deviation of the adhesion results is smaller for the inventive experiments (i.e. versus the comparative experiments).

What is claimed is:

1. A fibre-reinforced belt comprising fibres and vulcanized, oxazinolated hydrogenated nitrile rubber, wherein said oxazinolated hydrogenated nitrile rubber is characterized by having less than 10 mole percent unsaturation and by having oxazoline functionality which produces a characteristic peak at between 1552 cm$^{-1}$ and 1668 cm$^{-1}$ in the infrared spectrum and which has been prepared by reacting a solution of hydrogenated nitrile rubber with an amino alcohol of the formula

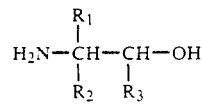

where $R_1$ and $R_2$ are independently selected from H and $CH_3$ and $R_3$ is selected from H, a $C_{1-5}$ alkyl and aryl in the presence of zinc acetate.

2. The belt of claim 1 wherein said oxazinolated hydrogenated nitrile rubber contains from 25 to 40 weight percent acrylonitrile units.

3. The belt of claim 2 wherein said oxazinolated hydrogenated nitrile rubber contains from 5 to 1 mole percent carbon-carbon double bonds.

4. The belt of claim 1 when vulcanized with a sulfur-containing vulcanization system.

5. The belt of claim 4 wherein said fibres are treated with resorcinol-formaldehyde.

6. The belt of claim 1 wherein said aminoalcohol is ethanolamine.

* * * * *